3,160,596
WAX - CONTAINING MELAMINE - FORMALDEHYDE FOAM AND PROCESS OF MAKING SAME

Frank R. Spencer, Stamford, Conn., assignor to Formica Corporation, Cincinnati, Ohio, a corporation of Delaware
No Drawing. Filed Oct. 2, 1961, Ser. No. 141,984
12 Claims. (Cl. 260—2.5)

This invention relates to novel foamable aminoplast resinous compositions, to the improved rigid aminoplast resin foams prepared therefrom, and to methods of producing such compositions and foams. More particularly, this invention relates to improved rigid aminoplast resin foams which are highly resistant to the passage of water vapor by diffusion and which are prepared by a process which comprises foaming a thermosetting aminoplast resinous condensate, such as a melamine-formaldehyde resinous condensate, containing wax in the form of an acid-stable emulsion.

Solid foams, both rigid and non-rigid, prepared from a wide variety of resinous materials, e.g., melamine-formaldehyde, urea-formaldehyde and phenol-formaldehyde resinous condensates, polystyrene, polyurethanes, and the like, have become important articles of commerce in recent years. Thus, for example, large quantities of rigid foams of various types have been used as thermal and acoustical insulating media, in packaging, to cushion against impact shock, and for a wide variety of more limited applications.

Foams prepared from melamine-formaldehyde resins possess many unique qualities. Among the most important of these are their mechanical strength properties and their ability to resist heat and flame. They gain compressive strength when heated to as high as 212° F. with only slight losses in weight and volume, retain a majority of their strength at temperatures up to 300° F., and do not begin to yellow until heated to at least 425° F. In addition, they only gradually char in a flame, and ceases to support combustion the moment the flame is withdrawn. Melamine-formaldehyde resin foams also have excellent resistance to common solvents, such as gasoline, benzene, ethyl acetate, methanol, acetone, and the like. Furthermore, aside from these properties of the finished (thermoset) foams, the thermosetting melamine-formaldehyde resins from which they are prepared possess, during foaming, the fundamental mechanical properties essential to the preparation of a satisfactory foam, i.e., they are in general labile foams having the proper specific gravity and fine structure (small cell size). In addition, foams prepared therefrom are stabile, i.e., able to withstand the stresses of returning to room temperature without harm to their specific gravity or cell structure.

However, conventionally prepared melamine-formaldehyde resin foams do exhibit one undesirable feature —high water vapor permeability—which precludes their use in many important applications. For example, a low water vapor transmission rate is particularly important if a foam to be used as a thermal insulating material, where low density, low heat transmission and low corrosiveness must be maintained even where the foam is used in an application where one of its surfaces is below the dew point for conditions existing at the opposite surface.

I have now discovered that the rate of diffusion of water vapor through thermoset aminoplast resin foams, such as melamine-formaldehyde resin foams, can be markedly reduced, with no sacrifice in other desirable properties, by forming such foams from thermosetting aminoplast resinous condensates containing minor amounts of wax in the form of an acid-stable emulsion.

It is, therefore, an object of my invention to provide novel rigid aminoplast resin foams.

It is also an object of my invention to provide novel rigid aminoplast resin foams, and particularly melamine-formaldehyde resin foams, which have been improved by the incorporation of wax therein.

A further object of my invention is to provide improved rigid aminoplast resin foams, and particularly melamine-formaldehyde resin foams, having reduced water vapor permeability.

These and other objects of my invention will be discussed more fully hereinbelow.

The thermosetting aminoplast resinous compositions which are used in accordance with the practice of the present invention are well known in the art. In general, they comprise resinous reaction products of formaldehyde or compounds engendering formaldehyde, such as paraformaldehyde, with melamine, urea or a mixture of these two amidogen compounds, which have been reacted to an intermediate stage of condensation whereby they remain as resinous materials which are soluble or readily dispersible in aqueous systems while also remaining capable of being converted to a substantially insoluble and infusible form.

Thermosetting melamine-formaldehyde resinous compositions wherein the mol ratio of formaldehyde to melamine is from about 1:1 to about 5:1, respectively, are particularly preferred, but thermosetting urea-formaldehyde resinous compositions having mol ratios of formaldehyde to urea ranging from about 0.5:1 to about 2:1, respectively, and mixed amidogen resins wherein the mol ratio of formaldehyde to melamine is from about 1:1 to about 5:1, respectively, and the mol ratio of formaldehyde to urea is from about 0.5:1 to about 2:1, respectively, may also be employed to provide foams having a wide range of desirable properties. Similarly, the properties of the finished foams may be further modified, if desired, by incorporating various substances together with the thermosetting aminoplast resinous condensates. For example, where more flexible foams are required, one may employ α-alkyl-D-glucosides, e.g., α-methyl-D-glucoside, as disclosed in U.S. Patent No. 2,773,848, to Lindenfelser, methylol derivatives corresponding to the general formula:

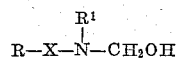

wherein R represents an alkyl, aryl, or aralkyl group, $R^1$ represents a hydrogen atom or an alkyl, alkylol, aryl or acyl group, and X represents —$SO_2$— or

e.g., N-methylol p-toluenesulfonamide (which may be formed in situ by the addition of p-toluenesulfonamide to the amidogen-formaldehyde reaction mixture), or combinations of these glucosides and methylol derivatives, as disclosed in U.S. Patent No. 2,773,788 to Magrane et al., as well as polyhydric alcohols such as sorbitol and the like, and particularly primary triols such as trimethylolethane, trimethylolpropane, tris-hydroxymethyl aminomethane and the like, as disclosed in the copending application of F. R. Spencer and A. J. Malashevitz, Serial No. 59,484, filed September 30, 1960, now U.S. Patent No. 3,093,600.

In general, the thermosetting aminoplast resinous compositions used in the practice of the present invention are prepared by techniques which are well known in the art and which may be varied to a considerable extent. Thus, the amidogen, e.g., melamine, and formaldehyde may be heat-reacted, preferably in aqueous medium, at temperatures ranging from about 40° C. to reflux temperature.

i.e., about 100° C., for periods of time ranging from about 30 minutes to about 120 minutes.

It is equally well known in the art that condensation reactions of this type are influenced by pH, the rate of reaction being accelerated by moderately low pH's. However, at relatively low pH's, i.e., about 6 or lower, the reaction is either so fast that it is uncontrollable or else the nature of the product formed is such that it has little or no utility in the preparation of foams. Thus, the practical pH range for the preparation of thermosetting aminoplast resinous compositions suitable for use in preparing solid foams will generally be from about 6.5 to about 10, and preferably from about 8.5 to about 9.0. A wide variety of organic or inorganic acidic and basic substances, such as triethanolamine, sodium hydroxide, sodium formate, formic acid, and the like, as well as acid-base buffering mixtures, may be employed, when necessary, to adjust the pH of the reaction mixture to within the above-stated ranges. Reaction under these alkaline conditions results, for the most part, in methylolation of the amidogen, although polymerization may also occur to a certain extent. Thus, suitable thermosetting resinous reaction products are obtained as soon as the uncombined formaldehyde present in the reaction mixture reaches a substantially constant minimum value. However, the reaction may be carried beyond this point, if desired, to provide products having relatively high solids contents, e.g., to the point at which the resin has developed a degree of hydrophobity such that a 60% aqueous solution thereof will exhibit cloudiness on further dilution.

Any of the large number of naturally occurring and synthetic waxes which have hydrophobic properties and which are capable of being formed into acid-stable wax emulsions, irrespective of their source or method of preparation, can be employed in the practice of the present invention. Among the most suitable of the naturally occurring waxes are the various grades of petroleum waxes, i.e., paraffin waxes, such as sweat waxes, slack waxes, scale waxes, and the more fully refined paraffin waxes; petrolatums, and microcrystalline waxes, but animal waxes, such as woolwax and the like, insect waxes, such as beeswax, shellac wax, and the like, vegetable waxes, such as carnauba wax, candelilla wax, japan wax, and the like, earth waxes, such as montan wax, ozocerite, and the like, and synthetic waxes, such as low molecular weight polyethylene waxes and the like, as well as mixtures of two or more of any of the aforementioned waxes, may also be employed.

Just as in the case of the thermosetting aminoplast resinous components of my novel foamable compositions, the acid-stable wax emulsions are prepared by techniques which are well known in the art. In general, the wax is merely melted and then dispersed in the form of fine droplets in water with the aid of an emulsifying agent. Ordinarily, the wax employed is one which melts below the boiling point of water, but higher melting waxes may be emulsified through the use of pressure equipment.

Among the emulsifying agents which can be employed in preparing the acid-stable wax emulsion there are included anionic emulsifiers, such as sodium salts of sulfonated naphthalene-formaldehyde condensates, sodium lignin sulfonate, sodium alkyl naphthalene sulfonates, e.g., sodium isopropyl naphthalene sulfonate, sodium butyl naphthalene sulfonate, and the like, non-ionic emulsifiers, such as the alkyl aryl polyether alcohols, e.g., alkyl phenol-ethylene oxide condensates, sorbitol-higher aliphatic fatty acid esters, e.g., sorbitan monolaurate, sorbitan monooleate, sorbitan trioleate, sorbitan monopalmitate, sorbitan monostearate, sorbitan tristearate, and the like, and the corresponding ethylene oxide condensation products, e.g., polyoxyethylene sorbitan monolaurate, polyoxyethylene sorbitan tristearate, and the like, and polysaccharide gums such as gum arabic, gum ghatti, and the like, as well as mixtures of anionic and non-ionic emulsifiers either with themselves or with the polysaccharide gums.

Cationic emulsifying agents in general are usually less suitable for use in preparing the acid-stable wax emulsion than anionic or non-ionic emulsifiers, due to the anionic nature of the thermosetting aminoplast resinous condensates with which the wax emulsion will be combined. However, certain cationic emulsifiers, e.g., stearamidopropyldimethyl - 2 - hydroxyethyl ammonium phosphate, stearamidopropyldimethyl-2-hydroxyethyl ammonium nitrate, and the like, may be used either together with or instead of an anionic or non-ionic emulsifying agent.

The wax component of the acid-stable wax emulsion may be present in amounts ranging up to about 65% by weight, e.g., from about 10% to about 65% by weight and preferably from about 40% to about 50% by weight, based on the total weight of the emulsion (e.g., wax, emulsifying agent(s) and water). The anionic, non-ionic and cationic emulsifiers, or mixtures thereof, when used as the sole emulsifying agents, i.e., in the absence of a polysaccharide gum, will be present in amounts ranging from about 0.5% to about 5% by weight, and preferably from about 0.5% to about 1.5% by weight, on the above-stated basis. Similarly, the polysaccharide gums, when used as the sole emulsifying agents, will be present in amounts ranging from about 0.3% to about 5% by weight, and preferably from about 0.5% to about 1.5% by weight, on the above-stated basis. When an ionic emulsifier is combined with a polysaccharide gum the same proportions obtain, so that the total amount of emulsifying agent present in this case will range from about 0.8% to about 10% by weight, and preferably from about 1% to about 3% by weight, on the above-stated basis.

The discovery that the incorporation of wax in the form of an acid-stable emulsion in rigid aminoplast resin foams results in a decrease in water vapor permeability by diffusion was unexpected for several reasons. First, of all, waxes by themselves are known to act as foam suppressors. However, I have found that this is not the case if the wax is present as an acid-stable emulsion in the aminoplast resinous composition being foamed. Secondly, wax-coated fabrics do not differ materially in water vapor permeability by diffusion from the corresponding uncoated fabrics, although there is a marked difference in their ability to repel water in liquid form. Exactly the reverse has been found for rigid aminoplast resin foams modified according to the practice of the present invention, i.e., the wax incorporated into these foams apparently does not retard the passage of liquid water through the foam, inasmuch as the rates of transmission exhibited by modified and unmodified foams immersed in water are substantially identical, and yet there is a marked difference in their rates of diffusion of water vapor from air.

The manner in which an acid-stable wax emulsion imparts this highly desirable property to rigid aminoplast resin foams is not entirely understood, inasmuch as the manner in which water vapor penetrates the foam by diffusion has not yet been clearly established. It was originally believed that there was a relationship between a high rate of water vapor diffusion and hidden cracks in the foam, which cracks can form in the following manner. As a wet foamed composition is dried, it contracts to a degree which depends on both the density of the foam and its composition. This contraction is not entirely uniform, since the surface of the foam dries so much faster than the interior that tensile stress first arises and concentrates at random on the surface. If this stress is relieved by a crack, the crack progresses towards the interior as drying continues. However, when the center of the foam dries, the stresses built up in this region are relieved through closing, but not sealing, of the existing cracks, so that the surfaces of the resulting dried foam may appear completely crack free. A similar effect accompanies rapid heating of foams containing negligible free water, i.e., cracks open and close, probably in relation to the loss of water of condensation, and while these cracks do not reappear when the dried foam in cooled, the formation of new internal cracks can be detected by faint to loud popping noises within the foam itself. However, it has been established that high water vapor diffusion rates occur even in the absence of cracks, and thus must result from another type of mechanical flaw in the finished foams.

Careful examination of conventionally prepared rigid aminoplast resin foams by photomicrographic and X-ray techniques has indicated that their foam structures are composed of two fundamentally different cell populations. In general, the skeletal structures of such foams were observed to be made up of relatively large cells, ranging from about 0.15 micron to about 0.45 micron in diameter, while superimposed on the walls of these cells there could be seen minute, circular discontinuities, averaging about 0.001 micron in diameter. Although the larger cells appeared to be intact, the discontinuities appeared to be open channels, particularly when examined by X-ray techniques, and thus would seem to provide passageways for water vapor to pass through the larger cells in the foam. While I do not wish to be bound by any theory advanced to explain the manner in which the wax furnished by an acid-stable wax emulsion provides resistance to the passage of water vapor by diffusion in thermoset aminoplast resin foams, it appears that wax incorporated in this manner may function in any of several ways. For example, it may act to relieve stresses between the large cells by filling the voids between them, or it may actually serve to fill the discontinuities, thus closing the passageways between the large cells.

My novel, foamable, thermosetting aminoplast resinous compositions are preferably prepared as aqueous dispersions which comprise the thermosetting aminoplast resinous condensate, the acid-stable wax emulsion, and a minor amount of a surface-active foaming agent, together with conventionally employed additives such as fillers, e.g., particulate or fibrous fillers such as $\alpha$-cellulose, asbestos, acid-resistant clays, and the like, dyes, pigments, e.g., titanium dioxide, silica pigments, and the like, and which can be foamed by any of a wide variety of methods disclosed in the prior art. While the particular method employed in foaming these aqueous dispersions is not critical, a brief description of certain of the more common prior art methods will be given for purposes of illustration.

In essence, all such prior art foaming methods, as appropriated to the practice of the present invention, embody various ways of incorporating or generating a gas within the foamable aqueous dispersion, prior to extensive gelation or solidification thereof, to produce a resinous foam. The method I prefer to use consists merely of whipping air or any other suitable gas, e.g., carbon dioxide, nitrogen, and the like, either at atmospheric pressure or at higher pressures, into the foamable aqueous dispersion and hardening or curing the resulting foam by means of an acid catalyst. In other prior art methods which may be employed, the air may be replaced in whole or in part by one or more gases whose source is:

(1) a volatile, immiscible inert liquid, e.g., a halogenated saturated aliphatic hydrocarbon such as trichloromonofluoromethane, monochlorodifluoromethane, dichlorodifluoromethane, trichlorotrifluoroethane, dichlorotetrafluoroethane, and the like, which has a boiling point such that it will vaporize under the conditions at which the foam is being produced;

(2) the reaction of a dispersed metal, such as zinc, a primary hydride, such as sodium or lithium hydride, or a complex hydride such as lithium, sodium, potassium or aluminum borohydride with an acid which may also serve as the curing catalyst;

(3) the reaction of a carbonate, e.g., magnesium carbonate, with an acid.

In accordance with the preferred method, an aqueous solution or dispersion of the thermosetting aminoplast resinous condensate, having a resin solids content of from about 25% to about 65%, is admixed with the acid-stable wax emulsion and the surface-active foaming agent to result in an aqueous dispersion having a total solids content of from about 20% to about 60%.

The acid-stable wax emulsion will be employed in amounts such that the aqueous dispersion will contain from about 0.5% to about 10% by weight of wax, based on the total solids present (resin, wax, fillers, pigments, etc.). Thus, the finished foam will also contain from about 0.5% to about 10% by weight of wax, based on the total dry weight of the foam, intimately dispersed throughout the foam.

The surface-active foaming agent insures substantially complete dispersion of the various components of the foamable composition and, what is perhaps even more important, it also facilitates the formation of a labile foam having the necessary degree of stability, i.e., a foam which will not collapse before being hardened by means of the acid curing catalyst. Among the surface-active foaming agents which can be employed are the anionic and non-ionic emulsifiers mentioned above in connection with the preparation of the acid-stable wax emulsion, and particularly anionic substances such as the sodium alkyl naphthalene sulfonates, e.g., sodium butyl naphthalene sulfonate, in addition to a wide variety of other substances which are well known in the art as being useful for this purpose. The amount of surface-active foaming agent employed can be varied to a considerable extent depending on a number of factors, e.g., the nature of the foaming agent itself and the resin solids content of the aqueous dispersion, but in general the usual amount of these conventional surface-active foaming agents which will be employed ranges from about 0.5% to about 5% by weight, based on the weight of resin solids present in the aqueous dispersion.

Aeration of the aqueous dispersion can be accomplished by any suitable means, e.g., by the use of a high speed stirring device such as a Hobart or Oakes mixer. Mixing and aeration are usually continued for from about 30 seconds to about 4 minutes, to produce a labile foam having the desired specific gravity and consistency.

Either during foaming or after the foam has been whipped to the desired specific gravity and consistency, a minor amount of an acid curing catalyst is added. The amount used will depend primarily on the nature of both the thermosetting aminoplast resinous composition and the catalyst itself, but it usually will be an amount sufficient to bring the pH of the foamed dispersion to within the range of from about 3 to about 6, and preferably within the range of from about 3.5 to about 4.5. In general, any acid having a dissociation constant greater than about $1 \times 10^{-4}$, including both organic and inorganic acids, can be employed as the curing catalyst, e.g., acids such as formic, oxalic, maleic, fumaric, citric, phosphoric, sulfuric, hydrochloric, and the like.

Following the addition of the acid curing catalyst to the foamed dispersion, the foam is transferred to a mold as quickly as is practical and the molded foam is then dried. The conditions under which the foam is dried may be varied to a considerable extent. Thus, drying may be accomplished at either atmospheric pressure or at pressures above or below atmospheric, at temperatures ranging from about 40° F. to about the boiling point of water at the particular pressure chosen, for periods of time which may range from about 1 minute to a month or more. Any suitable means, such as radiant or convection heating, may be used to facilitate drying, a particularly useful method being high frequency electric heating, e.g., at from about 25 to about 300 megacycles.

The use of a high frequency electric current to develop heat within the foamed mass gives uniform heating through the mass, resulting in a substantially uniform cure and assuring a substantially uniform cell structure.

In order that those skilled in the art may more fully understand the inventive concept presented herein, the following illustrative examples are set forth. These examples are given solely by way of illustration and should not be considered as expressing limitations unless so set forth in the appended claims. All parts and percentages are by weight, unless otherwise stated.

EXAMPLE I

An aqueous dispersion of:

| | Parts |
|---|---|
| Melamine-formaldehyde resin [1] | 100.0 |
| Sodium butyl naphthalene sulfonate | 2.0 |
| Acid-stable wax emulsion [2] | 13.6 |
| α-Cellulose | 25.0 |
| Water | 229.7 |

[1] A commercially available melamine-formaldehyde resin having a mol ratio of formaldehyde:melamine of 2:1, respectively.
[2] Prepared by mechanically dispersing 48.1% of petroleum slack wax with 1.2% sodium lignin sulfonate and 0.7% gum ghatti in 50% of water.

was charged, together with an oxalic acid solution containing 13.5 parts of oxalic acid and 121.5 parts of water, to the mixing container of a Hobart mixer, where air was whipped into the catalyzed dispersion for 3 minutes with a high speed wire beater to give a wet foam having a pH of 4.5. Mixing was then discontinued, and the wet foam was transferred within 5 minutes to a mold which was lined and loosely covered with a thin polyethylene sheet. The filled, covered mold was placed in a forced circulation oven where it was warmed for 30 minutes with air at 205° F. The mold was then removed from the oven and allowed to cool to the point at which it could be comfortably handled, at which point the foam was removed from the mold, placed in a controlled humidity oven, and dried at 50% relative humidity for 5 days at 77° F.

EXAMPLES II–V

Four foam samples, three modified with an acid-stable wax emulsion and one unmodified control sample, were prepared by the method described in Example I above. The compositions of these foams and certain of their physical properties, together with those of the foam of Example I, are given in Table I.

*Table I*

| Components [1] | Example | | | | |
|---|---|---|---|---|---|
| | I | II | III | IV | V |
| Melamine-formaldehyde resin [2] | 100.0 | 100.0 | 100.0 | 100.0 | 100.0 |
| Sodium butyl naphthalene sulfonate | 2.0 | 2.0 | 1.5 | 1.5 | 1.5 |
| Acid-stable wax emulsion [2] | 13.6 | 13.2 | 21.6 | 12.0 | |
| α-Cellulose | 25.0 | | 25.0 | 25.0 | 25.0 |
| Asbestos fibers | | 23.0 | | | |
| Oxalic acid | 13.5 | 11.9 | | | |
| Phosphoric acid | | | 18.3 | 21.1 | 22.5 |
| Water [3] | 351.2 | 224.4 | 176.2 | 237.0 | 192.0 |
| Properties: | | | | | |
| pH of wet foam | 4.5 | 4.3 | 4.1 | 4.1 | 4.15 |
| Specific gravity of dried foam [4] | 2.9 | 2.38 | 2.54 | 3.30 | 2.4 |
| Water vapor permeability of dried foam [5] | 13 | | 19 | 15.1 | 40 |

[1] As parts by weight.
[2] As in Example I.
[3] Excluding water in acid-stable wax emulsions.
[4] In pounds per cubic foot.
[5] In perm-inches (one perm-inch = the number of grains of water passing through one square foot of a one inch thick foam section in one hour under a partial pressure of one inch of mercury, a grain being equal to 0.06480 gram).

EXAMPLE VI

An aqueous dispersion containing:

| | Parts |
|---|---|
| Melamine-formaldehyde resin [1] | 100.0 |
| Sodium butyl naphthalene sulfonate | 1.5 |
| Sorbitol (70% aqueous solution) | 6.5 |
| Wax [1] | 10.0 |
| α-Cellulose | 6.0 |
| Water | 62.0 |

[1] As in Example I.

was metered at the rate of 391 parts per minute to an Oakes Continuous Mixer, while at the same time a phosphoric acid solution containing 17.1 parts of 100% phosphoric acid and 189.0 parts of water was metered to the mixer at the rate of 434 parts per minute. Air was whipped into the resulting catalyzed dispersion at the rate of 6480 cc. per minute to give a wet foam having a pH of 4.3. The wet foam was continuously discharged from the mixer and flowed into a mold lined with a polyethylene sheet. When the mold was filled, it was covered with the polyethylene sheet and then stored overnight at 77° F. The foam was then removed from the mold and dried in a controlled humidity oven for seven days at 77° F. and 50% relative humidity. The dried foam had a density of 2.7 pounds pounds per cubic foot, was free from cracks and had a water vapor permeability of 4.7 perm-inches.

It will be obvious to those skilled in the art that other changes and variations may be made in carrying out the present invention without departing from the spirit and scope thereof as defined in the appended claims.

I claim:
1. A hardened foam structure having improved resistance to the passage of water vapor by diffusion which comprises a substantially insoluble and infusible resinous reaction product of formaldehyde and a member selected from the group consisting of melamine, urea, and mixtures thereof, and from about 1% to about 10% by weight, based on the total weight of said foam structure, of wax intimately dispersed throughout said foam structure.

2. A hardened foam structure having improved resistance to the passage of water vapor by diffusion which comprises a substantially insoluble and infusible resinous reaction product of formaldehyde and melamine, and from about 1% to about 10% by weight, based on the total weight of said foam structure, of wax intimately dispersed throughout said foam structure.

3. A hardened foam structure having improved resistance to the passage of water vapor by diffusion which comprises a substantially insoluble and infusible resinous reaction product of formaldehyde and urea, and from about 1% to about 10% by weight, based on the total weight of said foam structure, of wax intimately dispersed throughout said foam structure.

4. A hardened foam structure having improved resistance to the passage of water vapor by diffusion which comprises a substantially insoluble and infusible resinous reaction product of formaldehyde, melamine and urea, and from about 1% to about 10% by weight, based on the total weight of said foam structure, of wax intimately dispersed throughout said foam structure.

5. A hardened foam structure having improved resistance to the passage of water vapor by diffusion which comprises a substantially insoluble and infusible resinous reaction product of formaldehyde and melamine, and from about 1% to about 10% by weight, based on the total weight of said foam structure, of petroleum wax intimately dispersed throughout said foam structure.

6. A hardened foam structure having improved resistance to the passage of water vapor by diffusion which comprises a substantially insoluble and infusible resinous reaction product of formaldehyde and melamine, and from about 1% to about 10% by weight, based on the total weight of said foam structure, of paraffin wax intimately dispersed throughout said foam structure.

7. A hardened foam structure having improved resistance to the passage of water vapor by diffusion which comprises a substantially insoluble and infusible resinous reaction product of formaldehyde and melamine, and from about 1% to about 10% by weight, based on the total weight of said foam structure, of slack wax intimately dispersed throughout said foam structure.

8. A process for the preparation of a hardened foam structure having improved resistance to the passage of water vapor by diffusion which comprises: (1) forming an aqueous dispersion having a total solids content of from about 20% to about 60% from (A) a thermosetting resinous reaction product of formaldehyde and a member selected from the group consisting of melamine, urea, and mixtures thereof, (B) from about 1% to about 10% by weight, based on total solids, of wax in the form of an acid-stable emulsion, and (C) a surface-active foaming agent, (2) aerating said aqueous dispersion to produce a resinous foam, and (3) hardening said resinous foam in the presence of an acid catalyst, whereby said resinous foam is converted to a substantially insoluble and infusible state.

9. A process for the preparation of a hardened foam structure having improved resistance to the passage of water vapor by diffusion which comprises: (1) forming an aqueous dispersion having a total solids content of from about 20% to about 60% from (A) a thermosetting resinous reaction product of formaldehyde and melamine, (B) from about 1% to about 10% by weight, based on total solids, of wax in the form of an acid-stable emulsion, and (C) a surface-active foaming agent, (2) aerating said aqueous dispersion to produce a resinous foam, and (3) hardening said resinous foam in the presence of an acid catalyst, whereby said resinous foam is converted to a substantially insoluble and infusible state.

10. A process for the preparation of a hardened foam structure having improved resistance to the passage of water vapor by diffusion which comprises: (1) forming an aqueous dispersion having a total solids content of from about 20% to about 60% from (A) a thermosetting resinous reaction product of formaldehyde and melamine, (B) from about 1% to about 10% by weight, based on total solids, of petroleum wax in the form of an acid-stable emulsion, and (C) a surface-active foaming agent, (2) aerating said aqueous dispersion to produce a resinous foam, and (3) hardening said resinous foam in the presence of an acid catalyst, whereby said resinous foam is converted to a substantially insoluble and infusible state.

11. A process for the preparation of a hardened foam structure having improved resistance to the passage of water vapor by diffusion which comprises: (1) forming an aqueous dispersion having a total solids content of from about 20% to about 60% from (A) a thermosetting resinous reaction product of formaldehyde and melamine, (B) from about 1% to about 10% by weight, based on total solids, of paraffin wax in the form of an acid-stable emulsion, and (C) a surface-active foaming agent, (2) aerating said aqueous dispersion to produce a resinous foam, and (3) hardening said resinous foam in the presence of an acid catalyst, whereby said resinous foam is converted to a substantially insoluble and infusible state.

12. A process for the preparation of a hardened foam structure having improved resistance to the passage of water vapor by diffusion which comprises: (1) forming an aqueous dispersion having a total solids content of from about 20% to about 60% from (A) a thermosetting resinous reaction product of formaldehyde and melamine, (B) from about 1% to about 10% by weight, based on total solids, of slack wax in the form of an acid-stable emulsion, and (C) a surface-active foaming agent, (2) aerating said aqueous dispersion to produce a resinous foam, and (3) hardening said resinous foam in the presence of an acid catalyst, whereby said resinous foam is converted to a substantially insoluble and infusible state.

References Cited in the file of this patent
UNITED STATES PATENTS

| | | |
|---|---|---|
| 2,375,348 | Cohen | May 8, 1945 |
| 2,461,538 | Fischer | Feb. 15, 1949 |
| 2,744,075 | Roberts | May 1, 1956 |
| 2,789,095 | Lindwig | Apr. 16, 1957 |
| 2,953,534 | Schneider | Sept. 20, 1960 |